United States Patent

Kenyon et al.

[11] Patent Number: 5,084,580
[45] Date of Patent: Jan. 28, 1992

[54] POLYCYLIC DYES

[75] Inventors: Ronald W. Kenyon, Manchester; David F. Newton, Oldham; Derek Thorp, Heywood, all of England

[73] Assignee: Imperial Chemical Industries PLC, London, England

[21] Appl. No.: 410,630

[22] Filed: Sep. 21, 1989

[30] Foreign Application Priority Data

Oct. 3, 1988 [GB] United Kingdom ............... 8823158

[51] Int. Cl.$^5$ .......................................... C07D 493/04
[52] U.S. Cl. .................................. 549/299; 546/197; 544/148
[58] Field of Search ..................... 549/299; 546/197; 544/148

[56] References Cited

U.S. PATENT DOCUMENTS

| | | | |
|---|---|---|---|
| 4,115,404 | 9/1978 | Greenhalgh et al. | 549/299 |
| 4,333,877 | 6/1982 | Carey et al. | 549/299 |
| 4,916,240 | 4/1990 | Kenyon | 549/299 |

FOREIGN PATENT DOCUMENTS

| | | | |
|---|---|---|---|
| 0033583 | 8/1981 | European Pat. Off. | |
| 0252406 | 1/1988 | European Pat. Off. | 549/299 |
| 2103231 | 2/1983 | United Kingdom | 549/299 |

Primary Examiner—Mary C. Lee
Assistant Examiner—Lenora Miltenberger
Attorney, Agent, or Firm—Cushman, Darby and Cushman

[57] ABSTRACT

Compounds of the Formula VII:

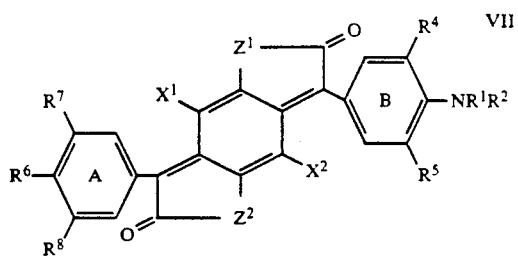

wherein;

$X^1$ and $X^2$ are each independently selected from H, cyano, alkyl, alkoxy, aryl, carbamoyl, sulphamoyl, COOH and carboxylic acid ester;

$Z^1$ and $Z^2$ are both —O—;

$R^1$ and $R^2$ are each independently selected from H, or an optionally substituted alkyl, alkenyl, cycloalkyl, aryl and aralkyl group; or $R^1$ and $R^2$ together with the N atom to which they are attached, form a heterocycle;

$R^4$, $R^5$, $R^7$ and $R^8$ are each independently selected from E, halogen, or an optionally substituted alkyl, alkenyl and alkoxy group or $R^1$ and $R^4$ or $R^2$ and $R^5$ together with the N atom and the two carbon atoms in Ring B to which they are attached form a heterocycle fused to Ring B; or $R^1$ and $R^7$ or $R^2$ and $R^8$ together with the N atom and the two carbon atoms in Ring A to which they are attached form a heterocycle fused to Ring A; or $R^6$ is selected from H, halogen, or an optionally substituted alkyl or alkoxy group and a group $NR^1R^2$ in which each of $R^1$ and $R^2$ are independently as hereinbefore described, and where $R^6$ is $NR^1R^2$, $R^6$ is the same or different from the $NR^1R^2$ group present in Ring B.

These compounds are suitable for the coloration of polyester textile material in shades from green through to reddish-blue.

10 Claims, No Drawings

POLYCYLIC DYES

This specification describes an invention relating to a process for the preparation of certain polycyclic dyes.

According to the present invention there is provided a process for the preparation of a polycyclic dye of the Formula I:

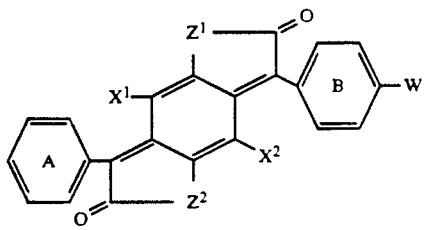

by reacting a phenyltartronic acid of Formula II:

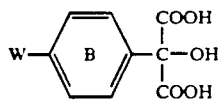

wherein

W is $-NR^1R^2$ or $-OR^3$;

$R^3$ is H or an optionally substituted alkyl, alkenyl, cycloalkyl or aralkyl group;

$R^1$ & $R^2$ each independently is H, or an optionally substituted alkyl, alkenyl, cycloalkyl, aralkyl or aryl group; or $R^1$ & $R^2$ together with the nitrogen atom to which they are attached form a heterocyclic ring; or $R^1$ and $R^2$ together with the nitrogen atom and the adjacent carbon atom of Ring B form a heterocyclic ring; and Ring B is unsubstituted, apart from the group W, or is substituted by one or two further groups;

with either (a) a compound of the Formula III:

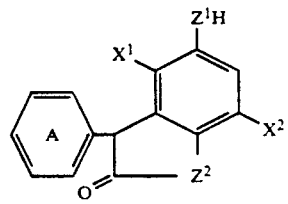

wherein, $Z^1$ & $Z^2$ each independently is $-O-$, $-S-$ or $-NY-$ in which Y is H, an optionally, substituted hydrocarbon group or an acyl group;

$X^1$ & $X^2$ each independently is H, halogen, cyano, alkyl, aryl, carbamoyl, suphamoyl, COOH or carboxylic acid ester; &

Ring A is unsubstituted or is substituted by from one to three groups;

or (b) a compound of the Formula IV:

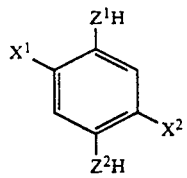

wherein $Z^1$, $Z^2$, $X^1$ and $X^2$ are as hereinbefore defined; and oxidation of the intermediate compound to dehydrogenate the peripheral hetercyclic rings.

The optionally substituted hydrocarbon group represented by Y is preferably $C_{1-8}$-alkyl, and more preferably $C_{1-4}$-alkyl, or monocyclic aryl, more preferably phenyl. The acyl group represented by Y is preferably $C_{1-4}$-alkyl- or monocyclic-aryl-carbonyl or -sulfphonyl which may be substituted by one or more groups selected from hydroxy, halogen, nitro, $C_{1-4}$-alkyl and $C_{1-4}$-alkoxy. Examples of the optionally substituted hydrocarbon groups represented by Y are alkyl and preferably $C_{1-4}$-alkyl, such as methyl, ethyl, n-propyl and iso-propyl; substituted alkyl, preferably substituted $C_{1-4}$-alkyl, such as beta-hydroxyethyl, beta-methoxyethyl and beta-ethoxyethyl; phenyl and substituted phenyl such as tolyl, chlorophenyl, nitrophenyl and $C_{1-4}$-alkoxyphenyl. Examples of the acyl groups represented by Y are acetyl, propionyl, n-butyryl, iso-butyryl, benzoyl and nitrobenzoyl, chlorobenzoyl, methylbenzoyl, methoxybenzoyl and hydroxybenzoyl.

The aryl group represented by $X^1$ or $X^2$ or preferably mono-homocyclic aryl, that is phenyl and substituted phenyl. The $C_{1-4}$-alkyl and alkoxy groups represented by $X^1$ or $X^2$ may also be substituted and suitable substituents for these and the aryl group are hydroxy, halogen, nitro, $C_{1-4}$-alkyl and $C_{1-4}$-alkoxy. The halogen represented by $X^1$ or $X^2$ is preferably chlorine or bromine.

The carbamoyl and sulphamoyl groups represented by $X^1$ or $X^2$ are preferably of the formula $-CONL^1L^2$ or $-SO_2NL^1L^2$ wherein $L^1$ and $L^2$ are each independently hydrogen, $C_{1-4}$-alkyl or monocyclic aryl, preferably phenyl. The carbonylic acid ester groups represented by $X^1$ and $X^2$ are preferably of the formula $-COOL^3$ wherein $L^3$ is optionally substituted alkyl, especially $C_{1-4}$-alkyl, or monocyclic aryl, especially phenyl, in which the substituents are as defined above.

When any of $R^1$ to $R^3$ is alkyl or alkenyl it preferably contains up to 20, more preferably up to 10 carbon atoms and especially up to 4, carbon atoms, with a preferred minimums of 3 carbon atoms for alkenyl groups); when cycloalkyl it is preferably $C_{4-8}$-cycloalkyl, such as cyclohexyl; and when aryl or aralkyl, the aryl is preferably monohomocyclic aryl, i.e. phenyl, and the aralkyl is preferably phenyl-$C_{1-4}$-alkylene, such as benzyl and phenylethyl. Where the groups represented by $R^1$ to $R^3$ are substituted, examples of preferred substituents are alkyl, alkoxy, nitro, halogen, alkoxyalkoxy, cyclohexyl, phenyl, diphenyl, hydroxy, alkylcarbonyl, alkoxycarbonyl, alkoxyalkoxycaronbyl, alkoxycarbonyloxy, alkoxyalkoxycarbonyloxy, alkylcarbonyloxy, cyano and amino in which each alkyl is preferably $C_{1-4}$-alkyl. Where the groups represented by $R^1$ and $R^2$, together with the nitrogen atom to which they are attached, form a heterocyclic group this is preferably alicyclic, such as piperidino or morpholino. Where a group represented by $R^1$ or $R^2$ together with the nitrogen atom to which heterocyclic group fused to Ring B or Ring A respectively, this is preferably a 6-membered heteroaliphatic ring, i.e. $R^1$ or $R^2$ is trimethylene, and the combined fused rings preferably form a tetrahydroquinolyl group.

It is preferred that the compound of Formula I is "unsymmetrical" by virtue of differences in the definitions of $Z^1$ and $Z^2$, $X^1$ and $X^2$ and/or Ring B, because lack of symmetry generally gives rise to an improvement in dyeing performance, especially in build-up on the fibre. However, it is generally preferred that $Z^1$ and $Z^2$ are identical and $X^1$ and $X^2$ are identical and that the lack of symmetry arises from differences in Rings A and B. Where Ring A and Ring B are different, the difference preferably lies in the nature and/or the number of substituents carried by each ring. The difference lies preferably in the identity of the groups $R^1$ to $R^3$ but may lie in the identity and/or the number of the substituents carried by the rings. Examples of further substituents for Ring B, in addition to the group W, are alkyl; alkenyl; alkoxy; alkoxyalkoxy; alkoxycarbonylalkoxy; alkoxyalkoxycaronbylalkoxy; alkylcarbonyloxyalkoxy; cyanoalkoxy, hydroxyalkoxy; halogen, especially chloine or bromine; hydroxy; alkylthio; arylthio; aryloxy; alkylcarbonyl and alkylsulphonyl; and especially such groups in which the alkyl or alkenyl contains up to 4 carbon atoms and the aryl is phenyl. Examples of substituents for Ring A, in addition to those listed above for Ring B, are $NR^1R^2$, $OR^3$ and NHacyl, especially $NHCOC_{1-4}$-alkyl and $-NHSO_2C_{1-4}$-alkyl.

It is preferred that $X^1$ and $X^2$ are both hydrogen and also preferred that $Z^1$ and $Z^2$ are both oxygen. When both these pairs of groups are identical, the preferred asymmetry in the compound of Formula I is provided by differences in Rings A and B. By this is meant that there is either a different number or different pattern of substituents on each ring.

The present process may be performed by heating the reactants in a melt but preferably in an acidic medium, preferably an organic acid, and especially an alkanecarboxylic acid such as acetic acid, propionic acid or butyric acid.

It is preferred to perform the process in which W is $OR^3$ in the presence of a strong acid catalyst, especially $H_2SO_4$. However, where W is $NR^1R^2$ such a catalyst is not generally required and is believed to have an adverse effect on the process.

The process is preferably performed at a temperature from 50° C. to 100° C., especially 70° C. to 100° C., where a solvent is present, conveniently under reflux. Reaction is preferably continued until all the starting materials are consumed which can take up to 25 hours.

Further reactions of the dyes in which any or all of $R^1$, $R^2$ and $R^3$ are H with alkylating, arylating or acylating agents permits the preparation of a wide range of substituted hydroxy and amino (secondary and tertiary amino) groups.

The final oxidation step may be effected by any convenient oxidising agent for dehydrogenating a carbon-carbon single bond, such as a persulphate or hydrogen peroxide.

The compound of Formula III, in which Ring A also carries a group $NR^1R^2$, may be prepared by the reaction of an amino-mandelic acid (in which the amino group is protected, if necessary, by acylation) with a hydroquinone in accordance with the procedure described in GB 2,068,402A.

According to a further feature of the present invention there is provided a process for the preparation of a compound according to Formula III in which Ring A carries a group $NR^1R^2$ in the 4-position which comprises reacting a mandelic acid of the Formula V:

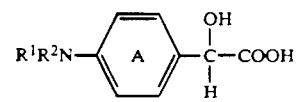

V wherein A has the same meaning as in Formula I with a compound of the Formula VI:

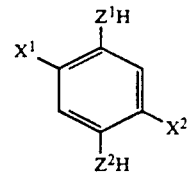

VI wherein $X^1$ and $X^2$ have the same meanings as in Formula I. It is preferred that, in Formula VI, $X^1$ and $X^2$ are both hydrogen.

This reaction is conveniently performed in an acidic medium in the presence of a strong acid catalyst as described above for the preparation of the compound of Formula I but at a lower temperature in the range 40° C. to 80° C. especially from 49° C. to 75° C.

The present process is especially suitable for the preparation of compounds of Formula I in which:

(a) Ring B carries a group, $NR^1R^2$, and both rings, optionally, carry one or more other substituents; or (b) Rings A and B both carry a group, $NR^1R^2$, which may be the same or different, and, optionally, one or more other substituents.

Compounds of Formula I in which W is $NR^1R^2$, Ring B carries a methyl group adjacent to $NR^1R^2$ and Ring A is unsubstituted or substituted in the 4-position by an alkyl or alkoxy group give blue shades when applied to synthetic fibres, especially polyesters, by disperse dyeing processes, and build up well to give navy shades and such compounds form a feature of the present invention.

According to a further feature of the present invention there is provided a compound of the formula:

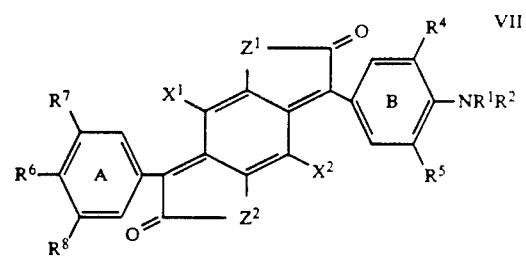

VII wherein $X^1$ & $X^2$ each independently is H, cyano, alkyl, aryl, carbamoyl, sulphamoyl, COOH or carboxylic acid ester;

$Z^1$ & $Z^2$ each independently is $-O-$, $-S-$ or $-NY-$ in which Y is H, an optionally-substituted hydrocarbon group or an acyl group;

$R^1$ & $R^2$ each independently is H or an optionally substituted alkyl, alkenyl, cycloalkyl, aryl or aralkyl group; or $R^1$ & $R^2$ together with the N atom to which they are attached, form a heterocycle;

$R^4$ & $R^5$ each independently is H, halogen or an optionally substituted alkyl, alkenyl or alkoxy group; or $R^1$ & $R^4$ together with the N atom and the two carbon atoms in Ring B to which they are attached form a heterocycle fused to Ring B; or $R^2$ & $R^5$ together with the N atom and the two carbon atoms in Ring B to which they are attached form a heterocycle fused to Ring B;

$R^6$ is H, halogen or an optionally substituted alkyl or alkoxy group or a group $NH^1R^2$ in which each of $R^1$ and $R^2$ is as hereinbefore defined;

$R^7$ & $R^8$ each independently is H, halogen or an optionally substituted alkyl, alkenyl or alkoxy group; or $R^1$ & $R^7$ together with the N atom and the two carbon atoms in Ring A to which they are attached form a heterocycle fused to Ring A; or $R^2$ & $R^8$ together with the N atom and the two carbon atoms in Ring A to which they are attached form a heterocycle fused to Ring A;

and where $R^6$ is $NR^1R^2$ this may be the same as or different from the $NR^1R^2$ group present in Ring B.

It is preferred that the compound of Formula VII is "unsymmetrical" by virtue of differences in the definitions of $Z^1$ and $Z^2$, $X^1$ and $X^2$ and/or the number and pattern of substituents on Ring A and Ring B, because lack of symmetry generally gives rise to an improvement in dyeing performance, especially in build-up on the fibre. It is preferred that $X^1$ and $X^2$ are the same and preferably H. It is also preferred that $Z^1$ and $Z^2$ are the same and preferably oxygen. Where $X^1$ and $X^2$ are identical and $Z^1$ and $Z^2$ are identical it is preferred that the lack of symmetry arises from a difference in the number or pattern of substituents on Ring A and Ring B.

Preferences for the groups represented by $X^1$, $X^2$, $Z^1$ and $Z^2$ are the same as for the same groups in Formula I.

In Ring A it is preferred that $R^6$ is independently selected from H, halogen, $C_{1-10}$-alkyl, $C_{3-10}$-alkenyl, $C_{1-10}$-alkoxy and $NR^1R^2$, in which each of $R^1$ and $R^2$ is independently H; $C_{1-6}$-alkyl, more especially $C_{1-4}$-alkyl; or $C_{1-4}$-alkyl substituted by a group selected from alkoxy, alkoxyalkoxy, hydroxy, cyano, halogen especially chlorine or bromine, phenyl, alkoxycarbonyl, alkoxyalkoxycarbonyl and alkylcarbonyloxy in which all the alkyl groups preferably contain up to 4 carbon atoms. Alternatively either $R^1$ and $R^7$ or $R^2$ and $R^8$, together with the N atom to which $R^1$ or $R^2$ is attached and two carbon atoms in Ring A, may form a piperidine ring fused to Ring A or $R^1$ and $R^2$, together with the N atom to which they are attached, may form a pendant mono or bicyclic hetercyclic group, especially piperidino or mopholino, attached to Ring A through the N atom. Where $R^6$ is not $NR^1R^2$, it is preferred that each of $R^7$ and $R^8$ is H.

In Ring B it is preferred that each of $R^1$ and $R^2$ independently is H; $C_{1-6}$-alkyl, more especially $C_{1-4}$-alkyl; or $C_{1-4}$-alkyl which is optionally substituted by a group selected from alkoxy, alkoxyalkoxy, hydroxy, cyano, halogen especially chlorine or bromine, phenyl, alkoxycarbonyl, alkoxycarbonyloxy, alkoxyalkoxycarbonyl and alkylcarbonyloxy in which all the alkyl groups preferably contain up to 4 carbon atoms; or that either $R^1$ and $R^4$ or $R^2$ and $R^5$, together with the N atom to which $R^1$ or $R^2$ is attached and two carbon atoms in Ring B, form a piperidine ring fused to Ring B; or that $R^1$ and $R^2$, together with the N atom to which they are attached, form a pendant mono or bicyclic heterocyclic group, especially piperidino or morpholino, attached to Ring B through the N atom. It is preferred that at least one of $R^4$ and $R^5$ is other than hydrogen and, especially, an alkyl or alkoxy group as hereinafter more specifically defined.

The alkyl group represented by $R^4$, $R^5$, $R^6$, $R^7$ or $R^8$ is preferably $C_{1-4}$-alkyl, especially methyl or ethyl. The alkenyl group represented by $R^4$, $R^5$, $R^6$, $R^7$ or $R^8$ is preferably $C_{3-4}$-alkenyl, especially allyl. The alkoxy group represented by $R^4$, $R^5$, $R^6$, $R^7$ or $R^8$ is preferably an unsubstituted $C_{1-10}$-alkoxy or a $C_{1-4}$-alkoxy group which is substituted by a group selected from alkoxy, hydroxy, alkylcarbonyloxy, alkoxyalkoxycarbonyl, alkoxycarbonyl, halogen and cyano, in which all the alkyl groups preferably contain up to 4 carbon atoms. The halogen represented by $R^4$, $R^5$, $R^6$, $R^7$ or $R^8$ is preferably chloine or bromine.

In one preferred sub-class of the compound of Formula VII, $X^1$, $X^2$ and $R^1$ are H; $Z^1$ and $Z^2$ are oxygen; $R^2$ is H or $C_{1-4}$-alkyl; $R^4$, $R^5$, $R^7$ and $R^8$ each independently is H, $C_{1-4}$-alkyl or $C_{1-10}$-alkoxy, more especially $C_{1-4}$-alkoxy; and $R^6$ is $NH_2$. The dyes of this preferred sub-class of Formula VII, generally give reddish-blue to turquoise shades on polyester textile materials with excellent fastness properties, especially heat and wet fastness. Specific examples of such dyes are:

TABLE 1

| $R^1$ | $R^2$ | $R^4$ | $R^5$ | $R^6$ | $R^7$ | $R^8$ |
|---|---|---|---|---|---|---|
| H | H | $CH_3$ | H | $NH_2$ | H | H |
| H | H | $OCH_3$ | H | $NH_2$ | H | H |
| H | H | Cl | H | $NH_2$ | H | H |
| H | H | $C_2H_5$ | H | $NH_2$ | H | H |
| H | H | $CH_3$ | $CH_3$ | $NH_2$ | H | H |

In another preferred sub-class of the compound of Formula VII, $X^1$, $X^2$, $R^1$, $R^5$, $R^7$ and $R^8$ are H; $Z^1$ and $Z^2$ are oxygen; $R^2$ is $C_{1-4}$-alkyl; $R^4$ is $C_{1-4}$alkyl or $C_{1-10}$-alkoxy, more especially $C_{1-4}$-alkoxy; and $R^6$ is H, $C_{1-4}$-alkyl or $C_{1-4}$alkoxy. The dyes of this preferred sub-class of Formula VII build up strongly on polyester textile materials to give strong navy shades with excellent fastness properties, especially heat and wet fastness. Specific examples of such dyes are:

TABLE 2

| $R^1$ | $R^2$ | $R^4$ | $R^5$ | $R^6$ | $R^7$ | $R^8$ |
|---|---|---|---|---|---|---|
| H | H | $CH_3$ | H | H | H | H |
| H | H | $CH_3$ | H | $CH_3$ | H | H |
| H | H | $C_2H_5$ | H | $OC_3H_7$ | H | H |
| H | H | n-$C_3H_7$ | H | $C_3H_7$ | H | H |
| H | H | $OCH_3$ | H | H | H | H |
| H | H | $OC_2H_5$ | H | $OC_3H_7$ | H | H |
| H | H | O-n-$C_3H_7$ | H | $OC_3H_7$ | H | H |
| H | $C_2H_5$ | $CH_3$ | H | H | H | H |

Examples of other dyes according to Formula VII are:

TABLE 3

| $R^1$ | $R^2$ | $R^4$ | $R^5$ | $R^6$ | $R^7$ | $R^8$ | $X^1$ |
|---|---|---|---|---|---|---|---|
| H | $C_2H_5$ | H | H | $NH_2$ | H | H | H |

TABLE 3-continued

| $R^1$ | $R^2$ | $R^4$ | $R^5$ | $R^6$ | $R^7$ | $R^8$ | $X^1$ |
|---|---|---|---|---|---|---|---|
| H | $C_2H_5$ | $CH_3$ | H | $NH_2$ | H | H | H |
| H | $C_3H_5$ | H | H | $NH_2$ | H | H | H |
| H | i-$C_3H_7$ | $CH_3$ | H | $NH_2$ | H | H | H |
| H | s-$C_4H_9$ | H | H | $NH_2$ | H | H | H |
| H | $C_2H_4COOH$ | H | H | $NH_2$ | H | H | H |
| —$CH_2CH_2$—O—$CH_2CH_2$— | | H | H | $NH_2$ | $CH_3$ | H | H |
| —$CH_2CH_2$—O—$CH_2CH_2$— | | H | H | $NH_2$ | H | H | H |
| —$CH_2CH_2$—O—$CH_2CH_2$— | | H | H | $N(EtCOOEtOEt)_2$ | H | H | H |
| H | H | $C_2H_5$ | H | $NH_2$ | $CH_3$ | H | H |
| —$CH_2CH_2CH_2CH_2CH_2$— | | H | H | $NH_2$ | H | H | H |
| H | —$CH_2CH_2CH_2$— | | H | $NH_2$ | H | H | H |
| $C_2H_5$ | $C_2H_5$ | H | H | $N(C_2H_5)_2$ | H | H | H |
| $C_2H_5$ | $C_2H_5$ | H | H | $N(C_2H_5)_2$ | H | H | $CH_3$ |
| H | H | $CH_3$ | $CH_3$ | $NH_2$ | $CH_3$ | H | H |
| $C_2H_4CN$ | $C_2H_4COOCH_3$ | H | H | $OC_3H_7$ | H | H | H |
| $CH_3$ | $CH_3$ | H | H | $NH_2$ | H | H | H |
| H | $C_2H_4OH$ | $CH_3$ | H | $NH_2$ | H | H | H |
| H | s-$C_4H_9$ | $CH_3$ | H | $NH(s-C_4H_9)$ | H | H | H |

In Table 3 and subsequent tables s-$C_4H_9$ is $$-CH-CH_3$$
$$\phantom{-}CH_2CH_3$$

The invention is further illustrated by the following examples in which all parts and percentages are by weight unless otherwise indicated.

EXAMPLE 1

A mixture of 2.84 g of 5-hydroxy-2-oxo-3-(4-acetylaminophenyl)-2,3-dihydrobenzofuran, 4.8 g of 4-amino-3-methyl-phenyltartronic acid (as the dipotassium salt) and 50 ml of glacial acetic acid was stirred under reflux for 18 hours. At the end of this period 2.5 g of ammonium persulphate was added and heating continued for a further 1 hour. After cooling to ambient the precipitated solid was filtered, washed acid-free with water, then methanol, and dried.

A mixture of 3.6 g of this product in 110 ml of 70% sulphuric acid was heated at 95° C. for 7 hours. After cooling, this mixture was drowned into 1 liter of water and the crude product, 3-(4-aminophenyl)-7-(3-methyl-4-aminophenyl)-2,6-dioxo-2,6-dihydrobenzo-[1:2-b,4:5-b']-difuran, isolated by filtration. This was then extracted into pyridine, screened and the solvent removed under vacuum. The product dissolved in pyridine to give a blue solution with an absorption maximum at 657 nm.

When applied to polyester material from an aqueous dispersion it gave a bright mid-blue shade with excellent heat and wet fastness properties and it also built up well.

The 5-hydroxy-2-oxo-3-(4-acetylaminophenyl)-2,3-dihydrobenzofuran used in this Example was prepared by stirring 21 g of 4-acetylaminomandelic acid and 11 g of hydroquinone in 95 ml of glacial acetic acid and 5 ml 100% sulphuric acid at 55° C. for 21 hours, cooling to ambient and drowning into 1 liter of water. The precipitate was isolated by filtration, washed acid-free with water and dried.

EXAMPLE 2

The procedure of Example 1 was repeated except that the 4.8 g of 4-amino-3-methylphenyltartronic acid was replaced by 3.2 g of 4-N-ethylaminophenyltartronic acid to give 3-(4-aminophenyl)-7-(4-N-ethylaminophenyl)-2,6-dioxo-2,6-dihydrobenzo[1:2-b,4:5-b']-difuran. This dissolved in pyridine to give a blue solution having an absorption maximum at 667 nm.

When applied to polyester from an aqueous dispersion it gave a bright blue shade with very high heat fastness and excellent wash and perspiration fastness.

EXAMPLE 3

The procedure of Example 1 was repeated except that in place of the 4.8 g of 4-amino-3-methylphenyltartronic acid there was used 4.7 g of 3-methyl-4-N-ethylaminophenyltartronic acid to give 3-(4-aminophenyl)-7-(3-methyl-4-N-ethylaminophenyl)-2,6-dioxo-2,6-dihydrobenzo[1:2-b,4:5-b']difuran. This dissolved in pyridine to give a greenish- blue solution having an absorption maximum at 667 nm.

When applied to a polyester textile material from an aqueous dispersion it gave a greenish blue shade having good fastness to wet treatments and it built up well.

EXAMPLE 5

The procedure of Example 1 was repeated except that in place of the 4.8 g of 4-amino-3-methylphenyltartronic acid there were used 5.0 g of 4amino-3-chlorophenyltartronic acid to give 3-(4-aminophenyl)-7-(4-amino-3-chlorophenyl)-2,6-dioxo-2,6-dihydrobenzo[1:2-b,4:5-b']difuran. This dissolved in pyridine to give a blue solution having an absorption maximum at 645 nm.

When applied to a polyester textile material from an aqueous dispersion it gave a reddish blue shade with good fastness to wet treatments.

EXAMPLE 6

The procedure of Example 1 was repeated except that in place of the 4.8 g of 3-amino-4-methylphenyltartronic acid there were used 5.4 g of 4-beta-carboxyethylaminophenyltartronic acid to give 3-(4-aminophenyl)-7-(4-beta-carboxyethylaminophenyl)-2,6-dioxo-2,6-dihydrobenzo[1:2-b,4:5-b']difuran. A portion of this product (1.3 g) was esterfied by stirring a boiling under reflux for 5 hours in a mixture of 75 ml of methanol and 7.5 ml of concentrated sulphuric acid to give 3-(4-aminophenyl)-7-(4-beta-carbomethoxyethylaminophenyl)- 2,6-dioxo-2,6-dihydrobenzo[1:2-b,4,:5-b']difuran. This dissolved in pyridine to give a blue solution having an absorption maximum at 656 nm.

When applied to polyester textile material from an aqueous dispersion it gave a bright blue shade with good fastness properties.

EXAMPLE 7

The procedure of Example 1 was repeated except that the 4.8 g of 4-amino-3-methylphenyltartronic acid was replaced by 4.7 g of 4N-allylaminophenyltartronic acid to give 3-(4-aminophenyl)-7-(4-N-allylaminophenyl)-2,6-dioxo-2,6-dihydrobenzo[1:2-b, 4:5-b']difuran. This dissolved in pyridine to give a blue solution having an absorption maximum at 663 nm.

When applied to polyester from an aqueous dispersion it gave a bright blue shade with good build up and high fastness to heat and wash treatments.

EXAMPLE 8

The procedure of Example 1 was repeated except that the 2.84 g of 5-hydroxy-2-oxo-3-(4-acetylaminophenyl)-2,3-dihydrobenzo-furan was replaced by 2.26 g of 5-hydroxy-2-oxo-3-phenyl-2,3-dihydro-benzofuran to give 3-phenyl-7-(3-methyl-4-aminophenyl)-2,6-dihydrobenzo[1:2-b, 4:5-b']difuran. This dissolved in pyridine to give a blue solution having an absorption maximum at 620 nm.

When applied to polyester from an aqueous dispersion it built up well to give a navy blue shades with good fastness to heat and wash treatments.

EXAMPLE 9

The procedure of Example 1 was repeated except that the 2.84 g of 5-hydroxy-2-oxo-3-(4-acetylaminophenyl)-2,3-dihydrobenzo-furan was replaced by 3.0 g of 5-hydroxy-2-oxo-3-(3-methyl-4-acetylaminophenyl)-2,3-dihydrobenzofuran and the 4.8 g of 4-amino-3-methylphenyltartronic acid by 4.8 g of 4-morpholinophenyltartronic acid. The product, 3-(3-(3-methyl-4-aminophenyl)-7-(4-morpholinophenyl)-2,6-dioxo-2,6-dihydrobenzo[1:2-b, 4:5-b'] -difuran, dissolves in pyridine to give a blue solution having an absorption maximum at 655 nm.

When applied to polyester from an aqueous dispersion it gives bright blue shades with good heat fastness and wash treatments.

The 5-hydroxy-2-oxo-3(3-methyl-4-acetylamniophenyl)-2,3-hydrobenzofuran used in this Example was prepared by stirring 14 g of 3-methyl-4-acetylaminomandelic acid with 6.9 g of hydroquinone in 95 ml of acetic acid and 5 ml of 100% sulphuric acid at 80° C. for 12 hours, cooling to ambient temperature and drowning into 1 liter of water. The precipitate was isolated by filtration, washed acid-free with water and dried.

EXAMPLE 10

The procedure of Example 9 was repeated except that in place of the 4.8 g of 4-morpholinophenyltartronic acid there was used 4.0 g of 4-amino-3-ethylphenyltartronic acid. The product, 3-(3methyl-4-aminophenyl)-7-(3-ethyl-4-aminophenyl)-2,6-dioxo-2,6-dihydrobenzo[1:2-b, 4:5-b']difuran, dissolves in pyridine to give a blue solution having an absorption maximum at 660 nm.

When applied to polyester from an aqueous dispersion it gives bright blue shades with good fastness to heat and wash treatments.

EXAMPLE 11

The procedure of Example 1 was repeated except that the 4.8 g of 4-amino-3-methylphenyltartronic acid was replaced by 3.9 g of 4-N-isopropylamino-3-methylphenyltartronic acid. The product, 3-(4-aminophenyl)-7-(4-isopropylamino-3-methylphenyl)-2,6-dioxo-2,6-dihydrobenzo[1:2-b, 4:5-b']difuran, dissolves in pyridine to give a blue solution having an absorption maximum at 655 nm.

When applied to polyester from aqueous dispersions it gives bright blue shades with good wet fastness and good heat fastness.

EXAMPLE 12

The procedure of Example 1 was repeated except that in place of the 4.8 g of 4-amino-3-methylphenyltartronic acid there was used 3.5 g of 4-N-sec-butylaminophenyltartronic acid. The product, 3-(4-aminophenyl)-7-(4-sec-butylaminophenyl)-2,6-dihydrobenzo[1:2-b, 4:5-b']difuran, dissolves in pyridine to give a blue solution having an absorption maximum at 676 nm.

When applied to polyester it gives blue shades with good heat and wet fastness.

EXAMPLE 13

The procedure of Example 1 was repeated except that the 4.8 g of 4-amino-3methylphenyltartronic acid was replaced by 3.6 g of 4-piperidinophenyltartronic acid. The product, 3-(4-aminophenyl)-7-(4-piperidinophenyl)-2,6-dioxo-2,6-dihydrobenzo[1:2-b, 4:5-b']difuran, dissolves in pyridine to give a blue solution having an absorption maximum at 664 nm.

When applied to polyester materials it gives blue shades with good fastness to heat and wet treatments.

EXAMPLE 14

The procedure of Example 1 was repeated except that the 4.8 g of 4-amino-3-methylphenyltartronic acid was replaced by 3.6 g of 1,2,3,4-tetrahydroquinolin-6-yltartronic acid. The product, 3-(4-aminophenyl)-7-(1,2,3,4-tetrahydroquinolin-6-yl)-2,6-dioxo-2,6-dihydrobenzo[1:2-b, 4:5-b']difuran, dissolves in pyridine to give a blue solution having an absorption maximum at 678 nm.

When applied to polyester materials from aqueous dispersions it gives blue shades with good heat and wet fastness.

EXAMPLE 15

A mixture of 0.62 g of 4-methylaminophenol, 4.4 g of 4-diethylaminophenyltartronic acid (as the dipotassium salt) and 25 ml of glacial acetic acid was stirred under reflux for 5 hours. 1.14 g of ammonium persulphate was then added and heating continued for 1 hour. After cooling to ambient temperature, 25 ml of water was added and the product, 3,7-di(4-diethylaminophenyl)-2,6-dioxo-5-methyl-2,6-dihydro-5H-furo[2:3-f]indole, isolated by filtration. It dissolves in chloroform to give greenish blue solutions having an absorption maximum at 676 nm.

When applied to polyester materials it gives greenish blue shades with good wet and heat fastness.

EXAMPLE 16

In place of the 0.62 g of 4-methylaminophenol used in Example 15 there was used 0.62 g of 2-methylhydroquinone. The product, 3,7-di(4-diethylaminophenyl)-4-methyl-2,6-dioxo-2,6-dihydrobenzo[1:2-b, 4:5-b']difuran, dissolves in chloroform to give a greenish blue solution having an absorption maximum at 685 nm.

When applied to polyester materials it gives greenish blue shades with good fastness to heat and wet treatments.

EXAMPLE 17

1.0 g of the product obtained as in Example 1 was dissolved in a mixture of 25 ml of methylethylketone and 10 ml of acetic acid. 1.0 g of sodium borohydride was added portionwise, the temperature rising to 50° C. After stirring for 1 hour a further 1.0 g of sodium borohydride was added, the temperature again rising to 50° C. After 15 minutes the reaction was complete as judged by TLC.

The reaction mixture was poured into 250 ml water and the precipitated product, 3-(4-sec-butylaminophenyl)-7-(4-sec-butylamino-3-methylphenyl)-2,6-dioxo-2,6-dihydrobenzo[1:2-b, 4:5-b']difuran, isolated by filtration, washing with water and drying. It dissolves in pyridine to give a greenish-blue solution having an absorption maximum at 695 nm.

When applied to polyester materials from aqueous dispersions it gives greenish-blue shades with good heat and wet fastness.

EXAMPLE 18

The procedure of Example 1 was repeated except that the 4.8 g of 4-amino-3-methylphenyltartronic acid was replaced by 5.0 g of 4-beta-hydroxyethyl-3-methylphenyltartronic acid to give 3-(4-aminophenyl)-7-(4-beta-hydroxyethylamino-3-methylphenyl)-2,6-dioxo-2,6-dihydrobenzo[1:2-b, 4:5-b']difuran. This dissolved in pyridine to give a blue solution having an absorption maximum at 670 nm.

When applied to polyesters materials from aqueous dispersions it gave blue shades with good heat and wet fastness.

EXAMPLE 19

The procedure of Example 1 was repeated except that the 4.8 g of 4-amino-3-methylphenyltartronic acid was replaced by 4.6 g of 4-amino-3,5-dimethylphenyltartronic acid to give 3-(4-aminophenyl)-7-(4-amino-3,5-dimethylphenyl)-2,6-dioxo-2,6-dihydrobenzo-[1:2-b, 4:5-b']difuran. It dissolves in pyridine to give a blue solution having an absorption maximum at 662 nm.

When applied to polyesters materials it gave blue shades with good heat and wet fastness.

EXAMPLE 20

The procedure of Example 1 was repeated except that the 2.84 g of 5-hydroxy-2-oxo-3-(4-acetylaminophenyl)-2,3-dihydrobenzo-furan was replaced by 2.84 g of 5-hydroxy-2-oxo-3(4-n-propylphenyl)-2,3-dihydrobenzofuran to give 3-(4-n-propoxyphenyl)-7-(4-amino-3-methylphenyl)-2,6-dioxo-2,6-dihydrobenzo[1:2-b, 4:5-b']difuran. It dissolves in pyridine to give a reddish-blue solution having an absorption maximum at 620 nm.

When applied to polyester materials it builds up to give away blue shades with good heat and wet fastness.

EXAMPLE 21

The procedure of Example 9 was repeated except that the 3.0 g of 5-hydroxy-2-oxo-3(3-methyl-4-acetylaminophenyl)-2,3-dihydrobenzofuran was replaced by 2.84 g of 5-hydroxy-2-oxo-3-(4-acetylaminophenyl)-2,3-dihydrobenzofuran to give 3-(4-aminophenyl)-7-(4-morpholinophenyl)-2,6-dioxo-2,6-dihydrobenzo[1:2-b, 4:5-b']-difuran. This dissolves in ethylacetate to give a blue solution having an absorption maximum at 618 nm.

When applied to polyester materials it gives reddish-blue shades with good heat and wet fastness.

EXAMPLE 22

1 g of the product obtained from Example 21 was added to a mixture of 50 ml of acrylic acid and 3.2 ml water and the mixture stirred at 70°-75° C. for 3 hours. After cooling to ambient temperature, 85 ml of water was added and the product isolated by filtration, washing with water and drying.

It was then added to a mixture of 20 ml of 2-ethoxyethanol and 1 ml of 100% sulphuric acid and heated at 70°-80° C. for 4 hours. After cooling the mixture was added to water (200 ml). The product 3-(4-(bis-[2-(2-ethoxyethyoxycaronbyl)ethyl]aminophenyl)-7-(4-morpholinophenyl)-2,6-dioxo-2,6-dihydrobenzo[1:2-b, 4:5-b']-difuran isolated by filtration, washed with water and dried. It dissolves in pyridine to give a blue solution having an absorption maximum at 665 n.

When applied to polyester textile materials it gives blue shades with good heat and wet fastness.

EXAMPLE 23

A mixture of 2.26 g of 5-hydroxy-2-oxo-3-phenyl-2,3-dihydrobenzofuran, 3.0 g of 4-hydroxyphenyltartronic acid (as the dipostassium salt), 23.75 ml of glacial acetic acid and 1.25 ml of concentrated sulphuric acid was stirred under reflux for 12 hours. After the addition of 2.2 g ammonium persulphate heating continued for 1 hour and cooled to ambient temperature. The cool mixture was added to 250 ml water and the product, 3-phenyl-7-(4-hydroxyphenyl)-2,6-dioxo- 2,6-dihydrobenzo]1:2-b, 4:5-b']difuran, isolated by filtration, washed successively with water and methanol and dried.

A mixture of 1.6 g of this product, 1.38 g $K_2CO_3$ (anhyd), 2.2 g ethoxyethyl bromoacetate and 25 ml of sulpholane was stirred and heated at 110° C. for 2 hours. The mixture was cooled to ambient temperature and added to 250 ml of stirred water. The product, 3-phenyl-7(4-(ethoxyethoxycarbonylmethoxy)phenyl)-2,6-dioxo-2,6-dihydrobenzo[1:2-b, 4:5-b']difuran, was isolated by filtration, washed successively with water and methanol and dried.

EXAMPLE 24

The procedure of Example 23 is repeated except that the 2.26 g of 5-hydroxy-2-oxo-3-phenyl-2,3-dihydrobenzofuran was replaced by 2.84 g of 5-hydroxy-2-oxo-3-(4-n-propoxyphenyl)-2,3-dihydrobenzo-furan. The product, 3-(4-hydroxyphenyl)-7-(4-n-propoxyphenyl)-2,6-dioxo-2,6-dihydrobenzo[1:2-b, 4:5-b']difuran, was isolated as in Example 23.

A mixture of 1.86 g of this product, 1.38 g $K_2CO_3$ (anhyd), 2.2 g ethoxyethyl bromoacetate and 25 ml of sulpholane was stirred and heated at 110° C. for 2½ hours. After cooling to ambient temperature, the mixture was added to 250 ml of water. The product, 3-(4-n-propoxyphenyl)-7(4-(ethoxyethoxycarbonylmethoxy)-phenyl)-2,6-dioxo-2,6-dihydrobenzo[1:2-b, 4:5-b']difuran, was isolated by filtration, washed successively with water and methanol and dried.

When applied to polyester materials from aqueous dispersion it gives bright bluish-red shades with good build up, good heat and light fastness and good wet fastness.

EXAMPLE 25

The procedure of Example 1 was repeated except that the 4.8 g of 4-amino-3-methylphenyltartronic acid was replaced by 4.8 g of 4-amino-3-ethylphenyltartronic acid. The product, 3-(4-aminophenyl)-7-(4-amino-3-ethylphenyl)-2,6-dioxo-2,6-dihydrobenzo-[1:2-b, 4:5-b']difuran, dissolves in pyridine to give a blue shade having an absorption maximum at 657 nm.

When a 50/50 mixture of this product and that of Example 1 was applied to polyesters materials from aqueous dispersions it gave bright blue shades with good build up and good heat and wet fastness.

EXAMPLE 26

The procedure of Example 1 was repeated except that the 2.84 g of 5-hydroxy-2-oxo-3-(4-acetylaminophenyl)-2,3-dihydrobenzo-furan was replaced by 3.0 g of 5-hydroxy-2-oxo-3-(4-acetylamino-3-methylphenyl)-2,3-dihydrobenzofuran. The product, 3,7-di-((3-methyl-4-aminophenyl)-2,6-dioxo-2,6-dihydrobenzo[1:2-b, 4:5-b']-difuran, dissolves in pyridine to give a blue solution having an absorption maximum at 660 nm.

When applied to polyesters materials it gives bright blue shades with good heat fastness and good fastness to wash treatments.

EXAMPLE 27

The procedure of Example 8 was repeated except that the 4.8 g of 4-amino-3-methylphenyltartronic acid was replaced by 4.4 g of 4-amino-3,5-dimethylphenyltartronic acid to give 3-phenyl-7-(4-amino-3,5-dimethylphenyl)-2,6-dioxo-2,6-dihydrobenzo-[1:2-b, 4:5-b']difuran. This dissolves in chloroform to give a reddish-blue shade having an absorption maximum at 580 nm.

When applied to polyester materials it builds up to give navy blue shades with good heat and wet fastness.

EXAMPLE 28

The procedure of Example 8 was repeated except that the 4.8 g of 4-amino-3-methylphenyltartronic acid was replaced by 4.6 g of 4-amino-3-ethylphenyltartronic acid to give 3-phenyl-7-(3-ethyl-4-aminophenyl)-2,6-dioxo-2,6-dihydrobenzo-[1:2-b, 4:5-b']difuran. This dissolves in chloroform to give a reddish-blue shade having an absorption maximum at 568 nm.

When applied to polyester materials it builds up to give navy blue shades with good heat and wet fastness.

EXAMPLE 29

The procedure of Example 8 was repeated except that the 4.8 g of 4-amino-3-methylphenyltartronic acid was replaced by 4.7 g of 4-amino-3-n-propylphenyltartronic acid to give 3-phenyl-7-(3-n-propyl-4-aminophenyl)-2,6-dioxo-2,6-dihydrobenzo-[1:2-b, 4:5-b']difuran. This dissolves in chloroform to give a reddish-blue shade having an absorption maximum at 568 nm.

When applied to polyester materials it builds up to give navy blue shades with good heat and wet fastness.

EXAMPLE 30

The procedure of Example 8 was repeated except that the 4.8 g of 4-amino-3-methylphenyltartronic acid was replaced by 4.5 g of 4-amino-3-methoxyphenyltartronic acid to give 3-phenyl-7-(3-methoxy-4-aminophenyl)-2,6-dioxo-2,6-dihydrobenzo-[1:2-b, 4:5-b']difuran. This dissolves in chloroform to give a reddish-blue shade having an absorption maximum at 600 nm.

When applied to polyester materials it builds up to give navy blue shades with good heat and wet fastness.

EXAMPLE 31

The procedure of Example 8 was repeated except that the 4.8 g of 4-amino-3-methylphenyltartronic acid was replaced by 5.3 g of 4-amino-3-ethoxyphenyltartronic acid to give 3-phenyl-7-(3-ethoxy-4-aminophenyl)-2,6-dioxo-2,6-dihydrobenzo-[1:2-b, 4:5-b']difuran. This dissolves in chloroform to give a reddish-blue shade having an absorption maximum at 600 nm.

When applied to polyester materials it builds up to give navy blue shades with good heat and wet fastness.

EXAMPLE 32

The procedure of Example 8 was repeated except that the 4.8 g of 4-amino-3-methylphenyltartronic acid was replaced by 5.5 g of 4-amino-3-methylphenyltartronic acid to give 3-phenyl-7-(3-n-propoxy-4-aminophenyl)-2,6-dioxo-2,6-dihydrobenzo-[1:2-b, 4:5-b']difuran. This dissolves in chloroform to give a reddish-blue shade having an absorption maximum at 605 nm.

When applied to polyester materials it builds up to give navy blue shades with good heat and wet fastness.

EXAMPLE 33

The procedure of Example 8 was repeated except that the 4.8 g of 4-amino-3-methylphenyltartronic acid was replaced by 5.0 g of 3-methyl-4-N-ethylaminophenyltartronic acid to give 3-phenyl-7-(3-methyl-4-N-ethylaminophenyl)-2,6-dioxo-2,6-dihydrobenzo-[1:2-b, 4:5-b']difuran. This dissolves in chloroform to give a reddish-blue shade having an absorption maximum at 620 nm.

When applied to polyester materials it builds up to give away blue shades with good heat and wet fastness.

The dyes identified in Tables 4 and 5 were prepared by the method of Example 1 using equivalent amounts of the substituted mandelic acid

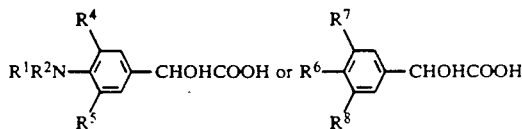

in place of the 4-acetylaminomandelic acid and of the substituted phenyl tartronic acid

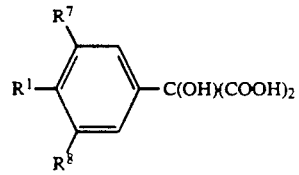

or

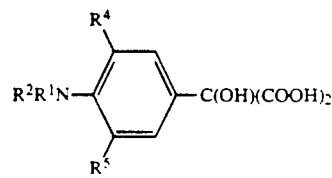

in place of 4-amino-3-methylphenyltartronic acid. In the case of the substituted mandelic acids in which $R^1$ and $R^2$ are H or $R^6$ is $NH_2$, the amino group was protected with an acetyl group which was subsequently removed by acid hydrolysis as described in Example 1.

In Table 4 the dyes correspond to Formula VII in which $X^1$, $X^2$, $R^5$ and $R^8$ are all H and $Z^1$ and $Z^2$ are both O.

TABLE 4

| Ex | $R^6$ | $R^1$ | $R^2$ | $R^4$ | $R^7$ | λmax/Shade |
|---|---|---|---|---|---|---|
| 34 | —NHCH$_3$ | —H | —H | —H | —H | Mid Blue |
| 35 | —N(CH$_3$)$_2$ | —CH$_3$ | —CH$_3$ | —H | —H | Turquoise |
| 36 | —NHCH(CH$_3$)$_2$ | —H | —H | —H | —H | Mid Blue |
| 37 | —N(C$_2$H$_5$)$_2$ | —H | —H | —H | —H | Greenish-blue |
| 38 | —NHEtCOOEt | —C$_2$H$_5$ | —C$_2$H$_5$ | —H | —H | Greenish-blue |
| 39 | —NHEtCOOMe | —H | —H | —H | —H | 656 |
| 40 | —NHEtCOOEt | —H | —H | —H | —H | Mid Blue |
| 41 | —N(C$_2$H$_5$)$_2$ | —EtCOOEtOMe | as $R^1$ | —H | —H | 701 |
| 42 | —NHEtCOOEtOMe | —H | —H | —H | —H | Mid Blue |
| 43 | —N(C$_2$H$_5$)$_2$ | —EtCOOMe | as $R^1$ | —H | —H | 688 |
| 44 | —N(EtCOOMe)$_2$ | —H | —C$_2$H$_5$ | —CH$_3$ | —H | 655 |
| 45 | —NH$_2$ | —C$_2$H$_5$ | —EtCOOEt | —H | —H | Greenish-blue |
| 46 | —NHCH$_2$Ph | —H | —H | —H | —H | Mid blue |
| 47 | —N-morpholino | —CH(CH$_3$)$_2$ | —EtCOOMe | —H | —H | 672 |
| 48 | —N(C$_2$H$_4$OH)$_2$ | —EtCOOMe | as $R^1$ | —H | —H | Greenish-blue |
| 49 | —N(EtOCOMe)$_2$ | —EtCOOMe | as $R^1$ | —H | —H | Greenish-blue |
| 50 | —N-piperidino | —EtCOOEtOMe | as $R^1$ | —H | —H | 684 |
| 51 | —N-piperidino | —EtCOOMe | as $R^1$ | —H | —H | 677 |
| 52 | —NC$_2$H$_4$CN $\vert$ Et—COOMe | —C$_2$H$_4$CN | —EtCOOMe | —H | —H | Greenish-blue |
| 53 | —NHC$_2$H$_4$OH | —C$_2$H$_5$ | —C$_2$H$_5$ | —H | —H | Greenish blue |
| 54 | —N(C$_2$H$_4$OH)$_2$ | —H | —H | —H | —H | Greenish-blue |
| 55 | —NHCH(CH$_3$)$_2$ | —C$_2$H$_5$ | —C$_2$H$_5$ | —H | —H | 705 |
| 56 | —NH$_2$ | —H | —H | —CH$_3$ | —Cl | 656 |
| 57 | —N-morpholino | —CH(CH$_3$)C$_2$H$_5$ | —H | —CH$_3$ | —H | 675 |
| 58 | —N-morpholino | —CH(CH$_3$)$_2$ | —H | —CH$_3$ | —H | 670 |
| 59 | —N-morpholino | —CH(CH$_3$)$_2$ | —H | —H | —H | 674 |
| 60 | —N-morpholino | —CH(CH$_3$)C$_2$H$_5$ | —H | —H | —H | 676 |
| 61 | —NHEtCOOEt | —EtCOOEt | —H | —CH$_3$ | —H | 650 |
| 62 | —NHEtCOOMe | —CH(CH$_3$)$_2$ | —H | —H | —H | 688 |
| 63 | —NHC$_2$H$_5$ | —CH(CH$_3$)C$_2$H$_5$ | —H | —CH$_3$ | —CH$_3$ | 689 |
| 64 | —NHCH(CH$_3$)$_2$ | —CH(CH$_3$)C$_2$H$_5$ | —H | —H | —H | 698 |
| 65 | —NHC$_6$H$_{13}$ | —CH(CH$_3$)$_2$ | —H | —H | —H | 693 |
| 66 | —NHC$_2$H$_5$ | —CH(CH$_3$)$_2$ | —H | —CH$_3$ | —CH$_3$ | 691 |
| 67 | —NH—[CH] | —[CH] | —H | —CH$_3$ | —H | Turquoise |
| 68 | —NHEtCOOMe | —CH(CH$_3$)C$_2$H$_5$ | —H | —H | —H | 688 |
| 69 | —NH—[CH] | —H | —H | —H | —H | Mid Blue |
| 70 | —NH(s-C$_4$H$_9$) | —H | -s-C$_4$H$_9$ | —CH$_3$ | —C$_2$H$_5$ | 695 |
| 71 | —N(C$_2$H$_5$)$_2$ | —H | —H | —CH$_3$ | —H | 674 |
| 72 | —NHC$_2$H$_5$ | —H | —H | —CH$_3$ | —CH$_3$ | Greenish-blue |
| 73 | —NHCH(CH$_3$C$_2$H$_5$) | —C$_2$H$_5$ | —C$_2$H$_5$ | —H | —H | Turquoise |
| 74 | —N(C$_2$H$_5$)$_2$ | —CH(CH$_3$)$_2$ | —H | —CH$_3$ | —H | " |
| 75 | —NH—[CH[-pCH$_3$ | —C$_2$H$_5$ | —C$_2$H$_5$ | —H | —H | " |
| 76 | —NHCH(CH$_3$)$_2$ | —C$_2$H$_5$ | —CH$_2$—Ph | —H | —H | " |
| 77 | —NHCHCH$_2$CHCH$_3$ $\vert$ $\vert$ CH$_3$ CH$_3$ | —C$_2$H$_5$ | —C$_2$H$_5$ | —H | —CH$_3$ | Turquoise |
| 78 | —N(CH$_3$)$_2$ | —H | —H | —H | —H | Greenish-blue |
| 79 | —NH$_2$ | —C$_2$H$_5$ | —CH$_2$—Ph | —H | —H | Greenish-blue |
| 80 | —NHCH(CH$_3$)$_2$ | —CH(CH$_3$)$_2$ | —H | —CH$_3$ | —H | 689 |
| 81 | —NHEtCOOMe | —C$_2$H$_5$ | —EtCOOMe | —H | —H | Greenish-blue |
| 82 | —NH$_2$ | —H | —H | —OC$_2$H$_5$ | —H | 664 |
| 83 | —N(CH$_3$)$_2$ | —CH(CH$_3$)$_2$ | —H | —H | —H | Turquoise |
| 84 | —NHC$_6$H$_{13}$ | —C$_2$H$_5$ | —C$_2$H$_5$ | —H | —H | " |
| 85 | —NH$_2$ | —C$_4$H$_9$ | —C$_3$H$_6$—Ph | —H | —H | " |

In Table 4 and the subsequent tables:

| | | | |
|---|---|---|---|
| —NH—[CH]—pCH₃ | = | 4-methylcyclohexylamino— | |
| —[CH] | = | cyclohexyl | Ph = phenyl |
| —EtCOOEtOMe | = | —C₂H₄CO₂C₂H₄OCH₃ | —EtCOOMe = —C₂H₄CO₂CH₃ |
| —EtCOOEt | = | —C₂H₄CO₂C₂H₅ | —OEtMe = —OC₂H₄OCH₃ |
| —OEtOEt | = | —OC₂H₅OC₂H₅ | —OEtOCOMe = —OC₂H₅OCOCH₃ |

In Table 5 the dyes correspond to Formula VII in which $X^1$, $X^2$, $R^5$, $R^7$ and $R^8$ are all H and $Z^1$ and $Z^2$ are both O.

TABLE 5

| Ex | R⁶ | R¹ | R² | R⁴ | max/Shade |
|---|---|---|---|---|---|
| 86 | —OCH₃ | —EtCOOMe | —C₂H₄CN | —H | Reddish-blue |
| 87 | —OCH₃ | —EtCOOMe | —C₂H₄CO₂CH₃ | —H | " |
| 88 | —H | —C₂H₅ | —H | —H | 607 |
| 89 | —OC₃H₇ | —CH₃ | —CH₃ | —H | Navy |
| 90 | —H | —CH₃ | —H | —H | Reddish-blue |
| 91 | —H | —H | —H | —H | " |
| 92 | —OC₃H₇ | —EtCOOMe | —C₂H₄CN | —H | Navy |
| 93 | —H | —C₂H₅ | —C₂H₄OH | —H | 647 |
| 94 | —H | —C₂H₅ | —EtOCOMe | —H | Navy |
| 95 | —CH₃ | —H | —H | —CH₃ | Reddish-blue |
| 96 | —H | —CH₃ | —CH₃ | —H | " |
| 97 | —H | —EtCOOEt | —H | —H | " |
| 98 | —H | —C₄H₉ | —C₃H₆—Ph | —H | Navy |

Further dyes in accordance with Formula VII which can be made by the same process as the dyes in Tables 4 and 5 are shown in Tables 6, 7 and 8. In the dyes shown in Table 6 $X^1$, $X^2$, $R^5$, $R^7$ and $R^8$ are all H and $Z^1$ and $Z^2$ are both O.

TABLE 6

| Example | R⁶ | R⁴ | R¹ | R² |
|---|---|---|---|---|
| 99 | —H | —Cl | —H | —H |
| 100 | —H | —C₄H₉ | —H | —H |
| 101 | —H | —CH₃ | —H | —C₂H₄OH |
| 102 | —H | —CH₃ | —H | —C₂H₄CN |
| 103 | —H | —CH₃ | —H | —C₂H₄Cl |
| 104 | —H | —C₂H₅ | —H | —EtOCOMe |
| 105 | —H | —C₂H₅ | —H | —EtCOOMe |
| 106 | —H | —CH₃ | —H | —C₂H₄OCH₃ |
| 107 | —H | —CH₃ | —H | —C₃H₆—Ph |
| 108 | —H | —OC₄H₉ | —H | —H |
| 109 | —H | —OEtOEt | —H | —H |
| 110 | —H | —OEtOCOMe | —H | —H |
| 111 | —H | —OC₂H₄CN | —H | —H |
| 112 | —H | —OCH₃ | —H | —C₂H₄CN |
| 113 | —H | —OCH₃ | —H | —EtOCOMe |
| 114 | —H | —Br | —H | —C₂H₄OCH₃ |
| 115 | —CH₃ | —CH₃ | —H | —H |
| 116 | —C₂H₅ | —CH₃ | —H | —C₂H₅ |
| 117 | —Cl | —CH₃ | —H | —C₃H₇ |
| 118 | —OCH₃ | —H | —H | —H |
| 119 | —OC₄H₉ | —H | —H | —H |

TABLE 6-continued

| Example | R⁶ | R⁴ | R¹ | R² |
|---|---|---|---|---|
| 120 | —H | —H | —H | —C₆H₁₃ |
| 121 | —H | —CH₃ | —H | —C₆H₁₃ |
| 122 | —OCH₃ | —H | —H | —C₈H₁₇ |

In the dyes shown in Table 7 $X^1$, $X^2$, $R^5$ and $R^8$ are all H and $Z^1$ and $Z^2$ are both O.

TABLE 7

| Ex | R⁶ | R⁷ | R⁴ | R¹ | R² |
|---|---|---|---|---|---|
| 123 | —NH₂ | —Cl | —CH₃ | —H | —C₂H₅ |
| 124 | —NH₂ | —Br | —H | —H | —H |
| 125 | —NH₂ | —OEtOMe | —H | —C₂H₅ | —C₂H₅ |
| 126 | —NH₂ | —C₃H₇ | —H | —H | —H |
| 127 | —NH₂ | —C₂H₅ | —CH₃ | —H | —C₂H₄CN |
| 128 | —OC₃H₇ | —H | —H | —C₂H₄CN | —EtCOOMe |
| 129 | —N(C₂H₅)₂ | —H | —H | —EtCOOMe | —EtCOOMe |
| 130 | —N(C₂H₄OH)₂ | —CH₃ | —H | —C₂H₅ | —C₃H₇ |
| 131 | —H | —H | —H | —C₂H₅ | —C₂H₅ |
| 132 | —CH₃ | —H | —H | —C₂H₅ | —C₂H₅OH |
| 133 | —OCH₃ | —Cl | —H | —C₂H₅ | —C₂H₅ |
| 134 | —N(C₂H₅)₂ | —H | —CH₃ | —H | —EtOCOMe |
| 135 | —NHC₂H₅ | —CH₃ | —H | —C₂H₄OH | —C₂H₅ |
| 136 | —NHC₂H₄OH | —CH₃ | —CH₃ | —H | —C₂H₄CN |
| 137 | —NH₂ | —H | —CH₃ | —H | —Ph |
| 138 | —NHC₂H₅ | —H | —H | —H | 4-Cl—Ph— |

In the dyes shown in Tables 8 $X^1$ and $X^2$ are both H and $Z^1$ and $Z^2$ are both O.

TABLE 8

| Ex | R⁷ | R⁶ | R⁸ | R⁴ | R⁵ | R¹ | R² |
|---|---|---|---|---|---|---|---|
| 139 | —H | —NH₂ | —H | —CH₃ | —C₂H₅ | —H | —H |
| 140 | —Cl | —OC₃H₇ | —Cl | —H | —H | —H | —H |
| 141 | —Cl | —NH₂ | —Cl | —H | —H | —C₂H₅ | —H |
| 142 | —H | —H | —H | —C₂H₅ | —H | —H | —H |

We claim:
1. A compound of Formula I:

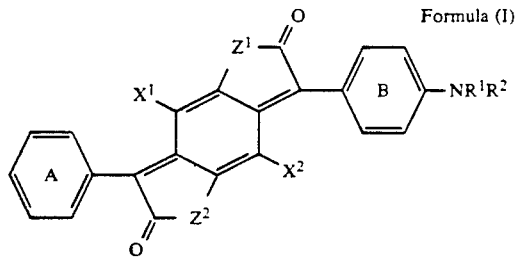

Formula (I)

wherein:

$X^1$ and $X^2$ are both H;
$Z^1$ and $Z^2$ are both O;
$R^1$ is selected from H, $C_{1-20}$-alkyl, $C_{2-20}$-alkenyl, $C_{4-8}$-cycloalkyl, phenyl-$C_{1-4}$-alkylene, and phenyl; $R^2$ is H;
Ring B carries a methyl group adjacent to $NR^1R^2$; and
Ring A is unsubstituted or substituted in the 4-position by an alkyl or alkoxy group.

2. A compound of Formula VII:

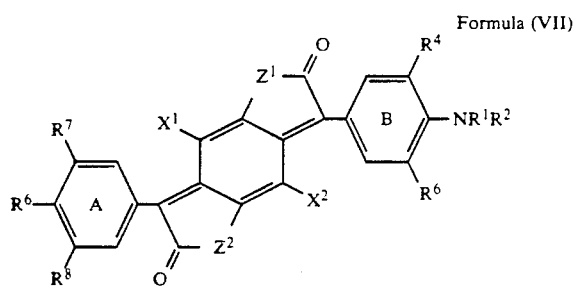

Formula (VII)

wherein:

$X^1$ and $X^2$ are identical and are selected from H, halogen, cyano, $C_{1-20}$-alkyl, $C_{1-4}$-alkoxy, phenyl, carbamoyl, sulphamoyl, COOH and carbonylic acid ester, and phenyl substituted by a group selected from the group consisting of hydroxy, halogen, nitro, $C_{1-4}$-alkyl and $C_{1-4}$-alkoxy;
$Z^1$ and $Z^2$ are both —O—;
$R^1$ is selected from H, $C_{1-20}$-alkyl, $C_{2-20}$-alkenyl, $C_{4-8}$-cycloalkyl, phenyl and phenyl-$C_{1-4}$-alkylene each of which is unsubstituted or is substituted by a group selected from $C_{1-4}$-alkyl, $C_{1-4}$-alkoxy, nitro, halogen, $C_{1-4}$-alkoxy-$C_{1-4}$-alkoxy, cyclohexyl, phenyl, diphenyl, hydroxy, $C_{1-4}$-alkylcarbonyl, $C_{1-4}$-alkoxycarbonyl, $C_{1-4}$-alkoxy-$C_{1-4}$-alkoxycarbonyl, $C_{1-4}$-alkoxycarbonyloxy, $C_{1-4}$-alkoxy-$C_{1-4}$-alkoxycarbonyloxy, $C_{1-4}$-alkylcarbonyloxy, cyano and amino;
$R^2$ is H;
$R^4$ and $R^5$ are each independently selected from H, halogen, $C_{1-4}$-alkyl, $C_{3-4}$-alkenyl and $C_{1-10}$-alkoxy;
$R^6$ is selected from H, halogen, $C_{1-4}$-alkyl, $C_{3-4}$-alkenyl, $C_{1-10}$-alkoxy group and a group $NR^1R^{24}$ in which $R^1$ is as hereinbefore defined and $R^{24}$ is selected from H, $C_{1-20}$-alkyl, $C_{2-20}$-alkenyl, $C_{4-8}$-cycloalkyl, phenyl and phenyl-$C_{1-4}$-alkylene each of which is unsubstituted or is substituted by a group selected from $C_{1-4}$-alkyl, $C_{1-4}$-alkoxy, nitro, halogen, $C_{1-4}$-alkoxy-$C_{1-4}$-alkoxy, cyclohexyl, phenyl, diphenyl, hydroxy, $C_{1-4}$-alkylcarbonyl, $C_{1-4}$-alkoxycarbonyl, $C_{1-4}$-alkoxy-$C_{1-4}$-alkoxycarbonyl, $C_{1-4}$-alkoxycarbonyloxy, $C_{1-4}$-alkoxy-$C_{1-4}$-alkoxycarbonyloxy, $C_{1-4}$-alkoxycarbonyloxy, cyano and amino;
$R^7$ and $R^8$ are each independently selected from H, halogen, $C_{1-4}$-alkyl, $C_{3-3}$-alkenyl and $C_{1-10}$-alkoxy group;
and where $R^6$ is $NR^1R^{24}$ this may be the same as or different from the $NR^1R^2$ group present in Ring B, provided that one of $R^4$ and $R^5$ is other than H; and provided that the number or pattern of substituents in Ring A and Ring B are different.

3. A compound of Formula VII:

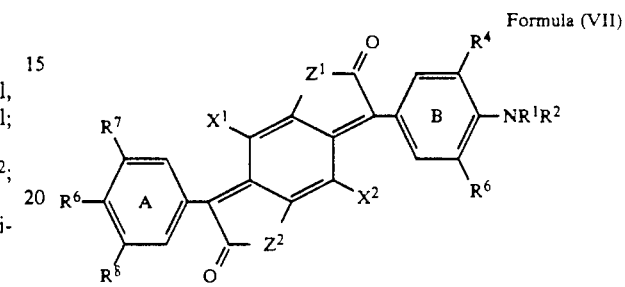

Formula (VII)

wherein:

$X^1$ and $X^2$ are identical and are selected from H, halogen, cyano, $C_{1-20}$-alkyl, $C_{1-4}$-alkoxy, phenyl, carbamoyl, sulphamoyl, COOH and carbonylic acid ester, and phenyl substituted by a group selected from the group consisting of hydroxy, halogen, nitro, $C_{1-4}$-alkyl and $C_{1-4}$-alkoxy;
$Z^1$ and $Z^2$ are both —O—;
$R^1$ is selected from H, or from $C_{1-20}$-alkyl, $C_{2-20}$-alkenyl, $C_{4-8}$-cycloalkyl, phenyl and phenyl-$C_{1-4}$-alkylene each of which is unsubstituted or substituted by a group selected from $C_{1-4}$-alkyl, $C_{1-4}$-alkoxy, nitro, halogen, $C_{1-4}$-alkoxy-$C_{1-4}$-alkoxy, cyclohexyl, phenyl, diphenyl, hydroxy, $C_{1-4}$-alkylcarbonyl, $C_{1-4}$-alkoxycarbonyl, $C_{1-4}$-alkoxy-$C_{1-4}$-alkoxycarbonyl, $C_{1-4}$-alkoxycarbonyloxy, $C_{1-4}$-alkoxy-$C_{1-4}$-alkoxycarbonyloxy, $C_{1-4}$-alkylcarbonyloxy, cyano and amino;
$R^2$ is selected from $C_{1-2}$-alkyl, $C_{2-20}$-alkenyl, $C_{4-8}$-cycloalkyl, phenyl and phenyl-$C_{1-4}$-alkene each of which is substituted by a group selected from $C_{1-4}$-alkyl, $C_{1-4}$-alkoxy, nitro, halogen, $C_{1-4}$-alkoxy-$C_{1-4}$-alkoxy, cyclohexyl, phenyl, diphenyl, hydroxy, $C_{1-4}$-alkylcarbonyl, $C_{1-4}$-alkoxycarbonyl, $C_{1-4}$-alkoxy-$C_{1-4}$-alkoxycarbonyl, $C_{1-4}$-alkoxycarbonyloxy, $C_{1-4}$-alkoxy-$C_{1-4}$-alkoxycarbonyl, $C_{1-4}$-alkoxycarbonyloxy, cyano and amino; or
$R^1$ and $R^2$ together with the N atom to which they are attached, form a piperidino or morpholino group;
$R^4$ and $R^5$ are each independently selected from H, halogen, $C_{1-4}$-alkyl, $C_{3-4}$-alkenyl and $C_{1-10}$-alkoxy;
$R^6$ is selected from H, halogen, $C_{1-4}$-alkyl, $C_{3-4}$-alkenyl, $C_{1-10}$-alkoxy group and a group $NR^9R^{10}$ in which $R^9$ and $R^{10}$ are each independently selected from H, $C_{1-20}$-alkyl, $C_{2-20}$-alkenyl, $C_{4-8}$-cycloalkyl, phenyl and phenyl-$C_{1-4}$-alkylene each of which is unsubstituted or is substituted by a group selected from $C_{1-4}$-alkyl, $C_{1-4}$-alkoxy, nitro, halogen, $C_{1-4}$-alkoxy-$C_{1-4}$-alkoxy, cyclohexyl, phenyl, diphenyl, hydroxy, $C_{1-4}$-alkylcarbonyl, $C_{1-4}$-alkoxycarbonyl, $C_{1-4}$-alkoxy-$C_{1-4}$-alkoxycarbonyl, $C_{1-4}$-alkoxycarbonyloxy, $C_{1-4}$-alkoxy-$C_{1-4}$-alkoxycarbonyloxy, $C_{1-4}$-alkoxycarbonyloxy, cyano and amino;

$R^7$ and $R^8$ are each independently selected from H, halogen, $C_{1-4}$-alkyl, $C_{3-3}$-alkenyl and $C_{1-10}$-alkoxy group;

provided that the number or pattern of substituents in Ring A and Ring B are different.

4. A compound according to claim 2 wherein $R^6$ is $NR^1R^{24}$ in which $R^1$ and $R^{24}$ are each independently selected from H, $C_{1-6}$-alkyl, $C_{3-4}$-alkenyl, cyclohexyl and $C_{1-4}$-alkyl which is substituted by a group selected from the group consisting of $C_{1-4}$-alkyl, $C_{1-4}$-alkoxy, $C_{1-4}$-alkoxy-$C_{1-4}$-alkoxy, nitro, cyano, halogen, cyclohexyl, phenyl, diphenyl, hydroxy, $C_{1-4}$-alkcarbonyl, amino, $C_{1-4}$-alkoxycarbonyl, $C_{1-4}$-alkoxy-$C_{1-4}$-alkoxycarbonyl and $C_{1-4}$-alkoxycarbonyloxy and, $R^1$ and $R^2$ together with the nitrogen atom to which they are attached form a piperidino or morpholino group.

5. A compound according to claim 2 or claim 3 wherein $X^1$ and $X^2$ are identical and are selected from H, halogen, cyano or from $C_{1-4}$-alkyl, $C_{1-4}$-alkoxy and phenyl each of which is unsubstituted or is substituted by a group selected from hydroxy, halogen, nitro, $C_{1-4}$-alkyl and $C_{1-4}$-alkoxy.

6. A compound according to claim 2 or claim 3 wherein one of $R^4$, $R^5$, $R^6$, $R^7$ and $R^8$ is selected from chlorine and bromine or from $C_{1-4}$-alkyl and $C_{1-4}$-alkoxy each of which is unsubstituted or is substituted by a group selected from $C_{1-4}$-alkoxy, hydroxy, $C_{1-4}$-alkylcarbonyloxy, $C_{1-4}$-alkoxy-$C_{1-4}$-alkoxycarbonyl, $C_{1-4}$-alkoxycarbonyl, halogen and cyano.

7. A compound according to claim 2 or claim 3 wherein $X^1$, $X^2$ and $R^2$ are H, $Z^1$ and $Z^2$ are oxygen, $R^1$ is H or $C_{1-4}$-alkyl, $R^4$, $R^5$, $R^7$ and $R^8$ are each independently selected from H, $C_{1-4}$-alkyl and $C_{1-4}$-alkoxy and $R^6$ is $NH_2$.

8. A compound of Formula VII:

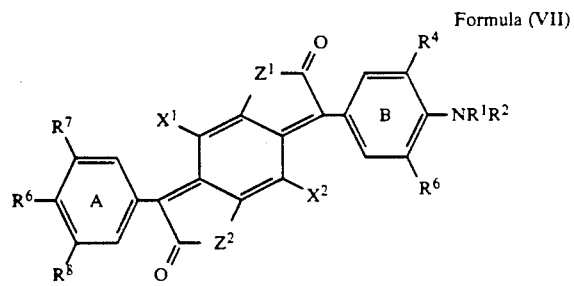

Formula (VII)

wherein:

$X^1$ and $X^2$ are identical and are selected from H, halogen, cyano, $C_{1-20}$-alkyl, $C_{1-4}$-alkoxy, phenyl, carbamoyl, sulphamoyl, COOH and carbonylic acid ester, and phenyl substituted by a group selected from the group consisting of hydroxy, halogen, nitro, $C_{1-4}$-alkyl and $C_{1-4}$-alkoxy;

$Z^1$ and $Z^2$ are both —O—;

$R^1$ is selected from H, $C_{1-20}$-alkyl, $C_{2-20}$-alkenyl, $C_{4-8}$-cycloalkyl, phenyl and phenyl-$C_{1-4}$-alkylene each of which is unsubstituted or is substituted by a group selected from $C_{1-4}$-alkyl, $C_{1-4}$-alkoxy, nitro, halogen, $C_{1-4}$-alkoxy-$C_{1-4}$-alkoxy, cyclohexyl, phenyl, diphenyl, hydroxy, $C_{1-4}$-alkylcarbonyl, $C_{1-4}$-alkoxycarbonyl, $C_{1-4}$-alkoxy-$C_{1-4}$-alkoxycarbonyl, $C_{1-4}$-alkoxycarbonyloxy, $C_{1-4}$-alkoxy-$C_{1-4}$-alkoxycarbonyloxy, $C_{1-4}$-alkylcarbonyloxy, cyano and amino; or $R^1$ and $R^2$ together with the N atom to which they are attached, form a piperidino or morpholino group;

$R^4$ and $R^5$ are each independently selected from H, halogen, $C_{1-4}$-alkyl, $C_{3-4}$-alkenyl and $C_{1-10}$-alkoxy;

$R^6$ is selected from H, halogen, $C_{1-4}$-alkyl, $C_{3-4}$-alkenyl, $C_{1-10}$-alkoxy group and a group $NR^1R^2$ in which $R^1$ and $R^2$ are each independently as hereinbefore defined;

$R^7$ and $R^8$ are each independently selected from H, halogen, $C_{1-4}$-alkyl, $C_{3-3}$-alkenyl and $C_{1-10}$-alkoxy group;

and where $R^6$ is $NR^1R^2$, this may be the same as or different from the $NR^1R^2$ group present in Ring B, provided that the number or pattern of substituents in Ring A and Ring B are different, except for the compound in which each of $R^1$ and $R^2$ are methyl, and each of $R^4$, $R^5$, $R^6$, $R^7$, $R^8$, $X^1$ and $X^2$ is hydrogen.

9. A compound of the formula:

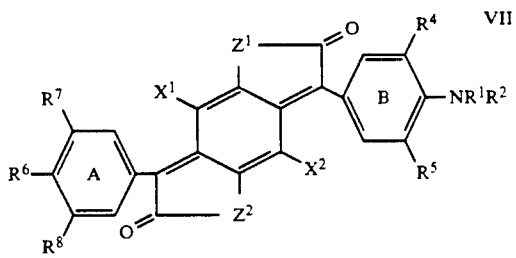

VII wherein $X^1$, $X^2$, $R^1$, $R^5$, $R^7$ and $R^8$ are H, $Z^1$ and $Z^2$ are oxygen, $R^2$ is H, $C_{1-4}$-alkyl, $R^4$ is $C_{1-4}$-alkyl or $C_{1-4}$-alkoxy and $R^6$ is H, $C_{1-4}$-alkyl or $C_{1-4}$-alkoxy.

10. A compound selected from:
3-(4-aminophenyl)-7-(3-methyl-4-aminophenyl)-2,6-dioxo-2,6-dihydrobenzo-[1:2-b; 4:5-b']-difuran,
3-(4-aminophenyl)-7-(3-ethyl-4-aminophenyl)-2,6-dioxo-2,6-dihydrobenzo-[1:2-b; 4:5-b']-difuran,
3-phenyl-7-(3-methyl-4-aminophenyl)-2,6-dioxo-2,6-dihydrobenzo-[1:2-b; 4:5-b']-difuran,
3-phenyl-7-(3-ethyl-4-aminophenyl)-2,6-dioxo-2,6-dihydrobenzo-[1:2-b; 4:5-b']-difuran,
3-phenyl-7-(3-ethoxy-4-aminophenyl)-2,6-dioxo-2,6-dihydrobenzo-[1:2-b; 4:5-b']-difuran,
3-phenyl-7-(3-n-propoxy-4-aminophenyl)-2,6-dioxo-2,6-dihydrobenzo-[1:2-b; 4:5-b']-difuran,
3-phenyl-7-(3-n-propyl-4-aminophenyl)-2,6-dioxo-2,6-dihydrobenzo-[1:2-b; 4:5-b']-difuran,
3-phenyl-7-(3-methyl-4-N-ethylaminophenyl)-2,6-dioxo-2,6-dihydrobenzo-[1:2-b; 4:5-b']-difuran,
3-(4-n-propoxyphenyl)-7-(3-methyl-4-aminophenyl)-2,6-dioxo-2,6-dihydrobenzo-[1:2-b; 4:5-b']-difuran,
and 3-phenyl-7-(N,N-diethylaminophenyl)-2,6-dioxo-2,6-dihydrobenzo-[1:2-b:4:5-b']-difuran.

* * * * *

UNITED STATES PATENT AND TRADEMARK OFFICE
CERTIFICATE OF CORRECTION

PATENT NO. : 5,084,580   Page 1 of 3
DATED : January 28, 1992
INVENTOR(S) : Kenyon et al It is certified that error appears in the above-identified patent and that said Letters Patent is hereby corrected as shown below:

On the Title page, item ]54], and col. 1, line 1 should read
-- POLYCYCLIC DYES--.

Claim 2, Column 19, line 40, "carbonylic" should read --carboxylic--;

Column 19, line 55 should read: --$R^2$ is H;--;

Column 20, line 1, "$C_{1-4}$-alkoxycarbonyloxy" should read --$C_{1-4}$-alkylcarbonyloxy--;

Column 20, line 4, "$C_{3-3}$-alkenyl" should read --$C_{3-4}$-alkenyl--.

Claim 3, Column 20, line 28, "carbonylic" should read --carboxylic--;

Column 20, between lines 42 and 43, it should read --$R^2$ is selected from H, $C_{2-20}$-alkenyl, $C_{4-8}$-cycloalkyl, phenyl and phenyl-$C_{1-4}$-alkylene or--;

Column 20, line 51, "alkoxycarbonyloxy" should read --alkylcarbonyloxy--;

UNITED STATES PATENT AND TRADEMARK OFFICE
CERTIFICATE OF CORRECTION

PATENT NO. : 5,084,580

DATED : January 28, 1992

INVENTOR(S) : Kenyon et al

It is certified that error appears in the above-identified patent and that said Letters Patent is hereby corrected as shown below:

Column 20, line 67, "$C_{1-4}$-alkoxycarbonyloxy" should read --$C_{1-4}$-alkylcarbonyloxy--;

Column 21, line 2, "$C_{3-3}$-alkenyl" should read --$C_{3-4}$-alkenyl--.

Claim 4, Column 21, lines 6 and 7 should read --...wherein $R^6$ is $NR^1R^{2A}$--;

Column 21, line 12, "$C_{1-4}$-alkcarbonyl" should read --$C_{1-4}$-alkylcarbonyl--.

Claim 8, Column 21, line 52, "carbonylic" should read --carboxylic--;

Column 21, line 57, after "$R^1$", it should read --and $R^2$ are each independently--; delete "is";

Column 22, line 15, "$C_{3-3}$-alkenyl" should read --$C_{3-4}$-alkenyl--.

UNITED STATES PATENT AND TRADEMARK OFFICE
CERTIFICATE OF CORRECTION

PATENT NO. : 5,084,580

DATED : January 28, 1992

INVENTOR(S) : Kenyon et al

It is certified that error appears in the above-identified patent and that said Letters Patent is hereby corrected as shown below:

Claim 10, Column 22, between lines 48 and 49, it should read --3-phenyl-7-(3-methoxy-4-aminophenyl)-2,6-dioxo-2,6-dihydrobenzo-[1:2-b; 4:5-b']-difuran--.

Signed and Sealed this

Twenty-ninth Day of June, 1993

MICHAEL K. KIRK

Attest:

Attesting Officer

Acting Commissioner of Patents and Trademarks